US011433886B2

(12) United States Patent
Tzirkel-Hancock et al.

(10) Patent No.: US 11,433,886 B2
(45) Date of Patent: Sep. 6, 2022

(54) SYSTEM, VEHICLE AND METHOD FOR ADAPTING A DRIVING CONDITION OF A VEHICLE UPON DETECTING AN EVENT IN AN ENVIRONMENT OF THE VEHICLE

(71) Applicant: GM GLOBAL TECHNOLOGY OPERATIONS LLC, Detroit, MI (US)

(72) Inventors: Eli Tzirkel-Hancock, Ra'Anana (IL); Alex Gendelman, Givatayim (IL); Noam Shabtai, Ra'Anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 538 days.

(21) Appl. No.: 16/450,034

(22) Filed: Jun. 24, 2019

(65) Prior Publication Data
US 2020/0398832 A1    Dec. 24, 2020

(51) Int. Cl.
| | |
|---|---|
| *B60W 30/09* | (2012.01) |
| *B60W 10/20* | (2006.01) |
| *H04R 1/40* | (2006.01) |
| *B60W 10/184* | (2012.01) |
| *G05D 1/02* | (2020.01) |
| *B60W 30/095* | (2012.01) |
| *B60W 50/14* | (2020.01) |
| *G05D 1/00* | (2006.01) |
| *B60Q 9/00* | (2006.01) |
| *B60Q 5/00* | (2006.01) |

(52) U.S. Cl.
CPC ......... *B60W 30/0956* (2013.01); *B60Q 9/007* (2013.01); *B60Q 5/006* (2013.01); *B60Q 9/006* (2013.01)

(58) Field of Classification Search
None
See application file for complete search history.

(56) References Cited

U.S. PATENT DOCUMENTS

| 10,976,748 | B2* | 4/2021 | Silver | H04R 5/027 |
|---|---|---|---|---|
| 2017/0120814 | A1* | 5/2017 | Kentley | B60C 5/008 |
| 2018/0053413 | A1* | 2/2018 | Patil | G08G 1/0968 |
| 2018/0211528 | A1* | 7/2018 | Seifert | B60W 60/0015 |
| 2020/0031337 | A1* | 1/2020 | Soltanian | B60W 30/0956 |
| 2020/0089253 | A1* | 3/2020 | Sudo | G05D 1/0255 |
| 2020/0348687 | A1* | 11/2020 | Paudel | B60W 40/02 |
| 2021/0006926 | A1* | 1/2021 | Giron | H04R 1/403 |

\* cited by examiner

*Primary Examiner* — Angela Y Ortiz
*Assistant Examiner* — Michael T Silva
(74) *Attorney, Agent, or Firm* — Lorenz & Kopf LLP

(57) ABSTRACT

Methods and systems are provided for adapting a driving condition of a vehicle. The system includes a non-transitory computer readable medium having stored thereon a pre-programmed driving maneuver of the vehicle. The system also includes a processor configured to obtain audio data of acoustic sources in the environment of the vehicle. The processor is further configured to determine a receiving direction of the acoustic source based on the audio data. The processor is further configured to determine whether the acoustic source are located within the maneuver of the vehicle based on the pre-programmed or updated driving maneuvers and the determined receiving direction of the acoustic source. Furthermore, the processor is configured to determine a range between the vehicle and the acoustic source in order to determine that the acoustic source is located within the driving path of the vehicle.

15 Claims, 6 Drawing Sheets

SYSTEM, VEHICLE AND METHOD FOR ADAPTING A DRIVING CONDITION OF A VEHICLE UPON DETECTING AN EVENT IN AN ENVIRONMENT OF THE VEHICLE

INTRODUCTION

The technical field generally relates to control systems for controlling partially or fully autonomous vehicles, and more particularly relates to a system, a vehicle and a method for adapting a driving condition of a vehicle upon detecting an event in an environment of the vehicle.

A driving scenario of a vehicle often includes many different situations in which the driver must interact, for example, to avoid a collision between the vehicle and an object surrounding the vehicle. Such a driving scenario may involve the vehicle driving straight forward, making a left or right turn or a complex parking maneuver where the vehicle subsequently changes between driving forwards and backwards. These driving maneuvers can be carried out by the vehicle partially or fully autonomously, in particular using a processor of the vehicle system configured to drive such maneuvers. However, complex and unexpected driving scenarios or events can occur which makes it difficult for the autonomous vehicle system to predict possible changes of such a driving scenario or to determine whether an intervention of the vehicle system is required to avoid dangerous situations, for example to avoid a collision of the vehicle and an object nearby.

Accordingly, it is desirable to take into account and evaluate acoustic sources in the environment of a vehicle when controlling the vehicle in order to increase safety for the passengers and surrounding persons or objects. In addition, it is desirable to improve the redundancy of sensors for detecting environmental parameters used to control a vehicle. Furthermore, other desirable features and characteristics of the present invention will become apparent from the subsequent detailed description and the appended claims, taken in conjunction with the accompanying drawings and the foregoing technical field and background.

SUMMARY

A system is provided for adapting a driving condition of a vehicle upon detecting an event in an environment of the vehicle. The system includes a non-transitory computer readable medium having stored thereon a pre-programmed driving maneuver of the vehicle, wherein the pre-programmed driving maneuver is indicative of a driving path of the vehicle. The system also includes a processor configured to obtain audio data of an acoustic source in the environment of the vehicle. The processor is further configured to determine a receiving direction of the acoustic source based on the audio data, the receiving direction being indicative of a direction of the acoustic source relative to the vehicle. The processor is further configured to determine whether the acoustic source is located within the driving path of the vehicle based on the pre-programmed driving maneuver and the determined receiving direction of the acoustic source. Furthermore, the processor is configured to determine a range between the vehicle and the acoustic source if it is determined that the acoustic source is located within the driving path of the vehicle. The processor is configured to control the vehicle based on the determined range, for example by changing the velocity of the vehicle or a driving direction of the vehicle. The controlling of the vehicle based on the determined range may include further processing steps of the determined range before a control of the vehicle is initiated. The processor may further be configured to re-program the driving maneuver and/or to stop the vehicle. Thus, an updated driving maneuver can be generated which is indicative of the upcoming driving path of the vehicle. The update of the driving path can be carried out in real time.

In one embodiment, the processor is further configured to determine the range between the vehicle and the acoustic source only if it is determined that the acoustic source is located within the driving path of the vehicle.

In one embodiment, the non-transitory computer readable medium stores a set of audio models, each of the audio models being indicative of a respective acoustic scenario, wherein the processor is further configured to determine a type of the acoustic source based on the obtained audio data between the acoustic source and the set of audio models.

In one embodiment, the non-transitory computer readable medium further stores a set of audio models, each of the audio models being indicative of a respective acoustic scenario, wherein the processor is further configured to determine an urgency estimation of a current driving scenario based on the obtained audio data of the acoustic source and the set of audio models, wherein a positive urgency estimation is indicative of an upcoming collision event of the acoustic source and the vehicle.

In one embodiment, the processor is further configured to obtain second audio data of the acoustic source if the result of the urgency estimation is indeterminable, and to subsequently determine a second urgency estimation of another driving scenario based on the obtained second audio data of the acoustic source and the set of audio models.

In one embodiment, the processor is further configured to obtain further sensor data of the acoustic source in the environment of the vehicle, and to provide fused data based on a fusion of the further sensor data of the acoustic source with the audio data of the acoustic source.

In one embodiment, the further sensor data is obtained from a camera, a Lidar and/or a radar.

In one embodiment, the processor is further configured to verify the urgency estimation of the current driving scenario based on the fused data.

In one embodiment, the processor is further configured to control the vehicle based on the verified urgency estimation of the current driving scenario, wherein controlling the vehicle by the processor includes changing the driving path of the vehicle or stopping the vehicle.

In one embodiment, the acoustic source is a person, another vehicle, an animal and/or a loudspeaker. However, it is noted that any other acoustic source emitting an acoustic noise, tone or signal may be considered as an acoustic source.

In one embodiment, the system further includes an audio sensor arrangement having a plurality of audio sensor arrays, wherein each of the plurality of audio sensor arrays in the audio sensor arrangement is located at a distinct location of the vehicle.

In one embodiment, the audio sensor arrangement comprises two audio sensor arrays, each of the two audio sensor arrays having two audio sensors, for example microphones.

In one embodiment, the processor is further configured to determine the range between the vehicle and the acoustic source based on triangulation using the two audio sensor arrays.

In one embodiment, the processor is further configured to obtain audio data of a plurality of acoustic sources in the environment of the vehicle, to determine a receiving direction for each of the acoustic sources based on the audio data, the receiving directions being indicative of respective directions of the acoustic sources relative to the vehicle, and to determine for each of the acoustic sources whether the acoustic source is located within the driving path of the vehicle based on the pre-programmed driving maneuver and the determined receiving directions of each of the acoustic sources. It is possible that, for each acoustic source, two or more receiving directions may be determined using two or more audio sensor arrays, wherein the at least two receiving directions can then be used to localize the acoustic source.

In one embodiment, the processor is further configured to select the acoustic sources that are determined to be located within the driving path of the vehicle, and to determine a range between the vehicle and each of the selected acoustic sources, and to discard the acoustic sources that are determined not to be located within the driving path of the vehicle.

In one embodiment, the processor is further configured to determine a minimum range out of the determined ranges between the selected acoustic sources and the vehicle, and to select a single acoustic source from the plurality of acoustic sources, which is most proximal to the vehicle.

In one embodiment, the system further includes an audio sensor arrangement having a plurality of audio sensor arrays, wherein the processor is further configured to select one audio sensor array receiving a maximum signal-to-noise-ratio from the selected single acoustic source being most proximal to the vehicle, and to select an audio channel for an audio signal from an audio sensor of the selected audio sensor array.

In one embodiment, the processor is further configured to determine an urgency estimation of a current driving scenario based on the audio signal and a set of audio models stored on the non-transitory computer readable medium.

A vehicle is provided for adapting a driving condition upon detecting an event in an environment of the vehicle. The vehicle includes a non-transitory computer readable medium having stored thereon a pre-programmed driving maneuver of the vehicle, wherein the pre-programmed driving maneuver is indicative of a driving path of the vehicle. The vehicle further includes a processor configured to obtain audio data of an acoustic source in the environment of the vehicle, to determine a receiving direction of the acoustic source based on the audio data, the receiving direction being indicative of a direction of the acoustic source relative to the vehicle, to determine whether the acoustic source is located within the driving path of the vehicle based on the pre-programmed driving maneuver and the determined receiving direction of the acoustic source, and to determine a range between the vehicle and the acoustic source if it is determined that the acoustic source is located within the driving path of the vehicle. The processor is further configured to control the vehicle based on the determined range. The determination of the receiving direction of the acoustic source and the determination whether the acoustic source is located within the driving path of the vehicle as well as the determination of the range between the vehicle and the acoustic source can be applied using an updated maneuver, in addition or instead, to using the pre-programmed maneuver.

A method is provided for adapting a driving condition of a vehicle upon detecting an event in an environment of the vehicle. The method includes the step of storing, on a non-transitory computer readable medium, a pre-programmed driving maneuver of the vehicle, wherein the pre-programmed driving maneuver is indicative of a driving path of the vehicle. The method further includes the step of obtaining, by a processor, audio data of an acoustic source in the environment of the vehicle. The method further includes the step of determining, by the processor, a receiving direction of the acoustic source based on the audio data, the receiving direction being indicative of a direction of the acoustic source relative to the vehicle. The method further includes the step of determining, by the processor, whether the acoustic source is located within the driving path of the vehicle based on the pre-programmed driving maneuver and the determined receiving direction of the acoustic source. The method further includes the step of determining, by the processor, a range between the vehicle and the acoustic source if it is determined that the acoustic source is located within the driving path of the vehicle. The method further includes the step of controlling the vehicle based on the determined range.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
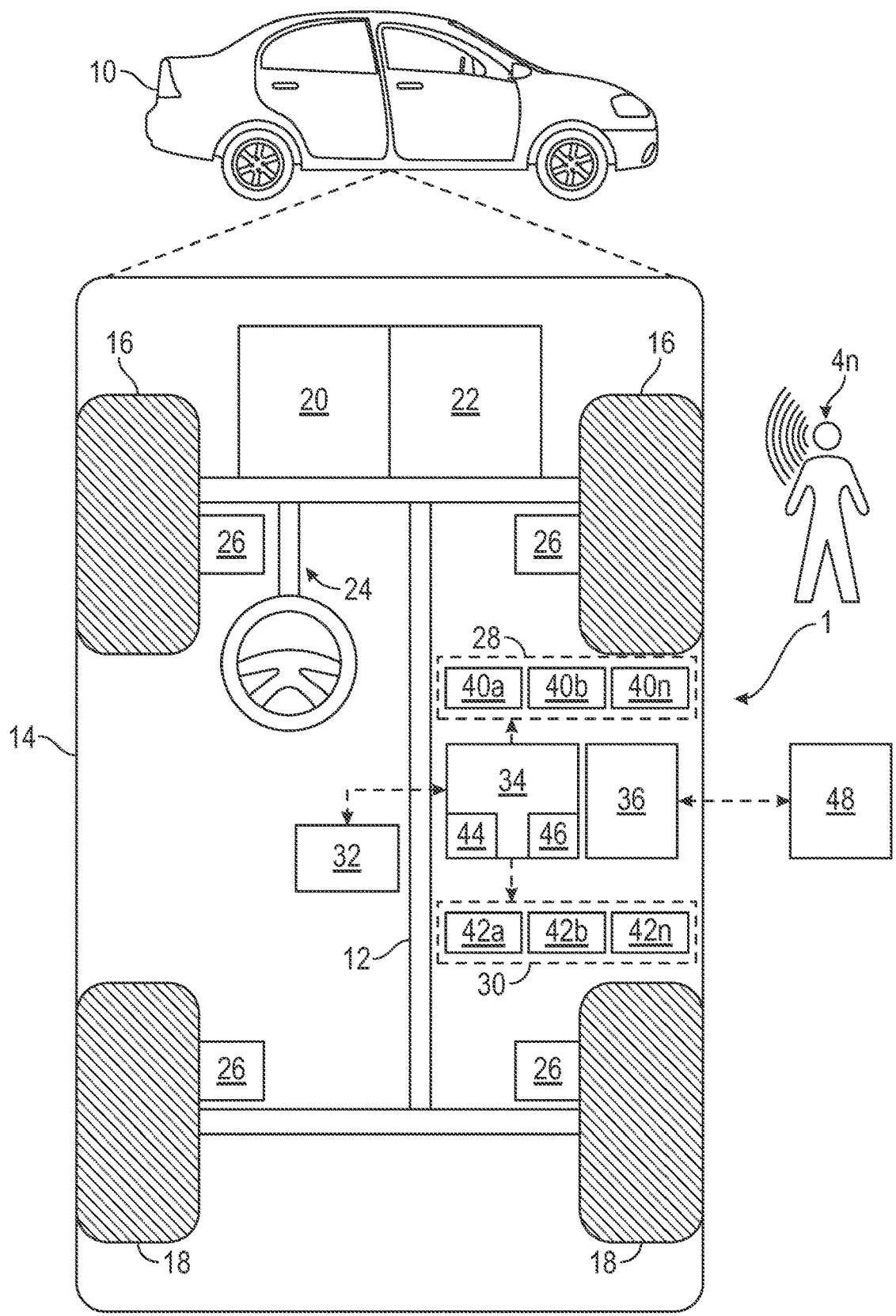
FIG. 1 is a vehicle having a system for adapting a driving condition of the vehicle upon detecting an event in an environment of the vehicle in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is appreciated, however, that the autonomous vehicle 10 may have any automation level from a Level Two system to a Level Five system.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, Lidars (light detection and ranging), acoustic sensors, global positioning systems, optical cameras, thermal cameras, ultrasonic sensors, and/or other sensors. For example, the sensing devices include an acoustic sensor like a microphone, etc. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The computer readable storage media 46 and/or the storage device 32 may store a pre-programmed driving maneuver of the vehicle 10, wherein the pre-programmed driving maneuver may be indicative of an upcoming driving path of the vehicle 10. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied. The controller includes the non-transitory computer readable medium 46 that stores a pre-programmed driving maneuver of the vehicle 10, which is indicative of a driving path of the vehicle 10 and, in particular indicates a driving path along which the vehicle 10 will travel. The controller also includes the processor 44 which is configured to obtain audio data of at least one acoustic source 41 in the environment of the vehicle 10. The acoustic source 41 may be any source emitting an acoustic wave or sound wave travelling, for example, through the air from the acoustic source 41 to the vehicle 10. The controller 34, in particular the functionality of the processor 44 will be described in more detail with reference to FIG. 2.

Figure 2:
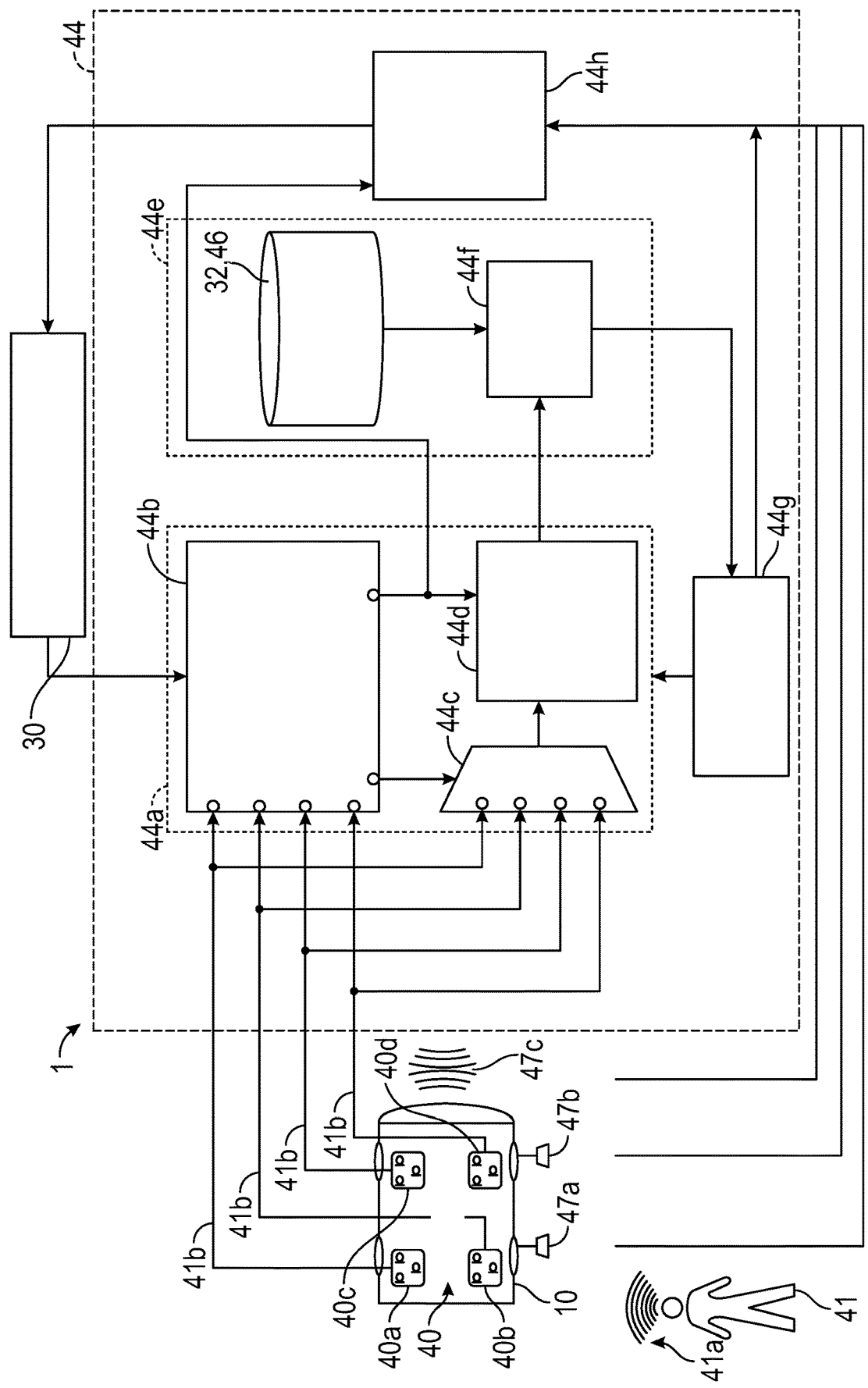
FIG. 2 is a schematic diagram showing a system architecture of the system for adapting a driving condition of a vehicle upon detecting an event in an environment of the vehicle in accordance with an embodiment.

FIG. 2 is a schematic diagram showing the system architecture of the system 1 for adapting a driving condition of the vehicle 10 shown in FIG. 1. The system 1 may be integrated in the vehicle 10, wherein the vehicle 10 is an autonomous vehicle (AV). The vehicle 10 comprises an audio sensor arrangement 40 including audio sensor arrays 40a-40d for sensing an acoustic signal 41a, for example a sound wave or acoustic wave, from an acoustic source 41 in the environment of the vehicle 10. Each of the acoustic sensor arrays 40a-40d is arranged at a distinct location at, on or within the vehicle 10. Each of the audio sensor arrays 40a-40d may include one or more audio sensors, for example microphones. In the example shown in FIG. 2, the acoustic source 41 is a person shouting or producing a noise in the environment. The audio sensor arrays 40a-40d receive the acoustic signal 41a from the person and generate acoustic signal data 41b which are provided to the processor 44. It is noted that the processor 44 as well as the AV vehicle controller or maneuver system module 30 are depicted separate to the vehicle 10 for reasons of clarity, however it is to be understood that the processor 44 and also the AV controller or maneuver system module 30 of an exemplary embodiment, are parts of the vehicle 10 or integrated into the vehicle 10. Different sensor array arrangements will be described with reference to FIGS. 6 to 10.

In an exemplary embodiment, the processor 44 comprises an array processing module 44a configured to obtain audio data of the acoustic source 41 based on the acoustic signal data 41b from the audio sensor arrays 40a-40d. Based on these audio data, the processor 44 determines a receiving direction of the acoustic source 41, wherein the receiving direction is indicative of a direction of the at least one acoustic source 41 relative to the vehicle 10. The receiving direction may, for example, be measured with reference to a longitudinal axis of the vehicle 10. The receiving direction therefore indicates the location of the acoustic source 41 relative to the vehicle 10, for example using three-dimensional coordinates. In particular, two receiving directions may indicate the location of the acoustic source 41. Therefore, at least two audio sensor arrays 40a-40d may be used to determine receiving directions of the acoustic source 41 for each of the at least two audio sensors arrays 40a-40d in order to determine the location of the acoustic source 41. Three-dimensional coordinates may be used to determine the location of the acoustic source 41, wherein it may be possible to ignore acoustic sources 41 that are located above the road, wherein acoustic sources 41 that lie on the road may be further considered. In an exemplary embodiment, all audio sensor arrays 40a-40d are used to determine, i.e. localize the acoustic source 41. This means that each audio sensor array 40a-40d determines one receiving direction for the acoustic source 41 so that, for each audio sensor array 40a-40d, one respective receiving direction of the acoustic source 41 is obtained. These receiving directions are then used to localize the acoustic source 41 and to estimate whether it is located in the driving path or not, i.e. to estimate whether it can be excluded that the acoustic source is located within the driving path or not. The localization is carried out by the localization module 44b of the processor 44. The localization may also use information from an inter-array energy difference which is calculated based on the intensity of the audio signals 41a received by each of the audio sensor arrays 40a-40d. In this manner, a receiving direction of the acoustic source 41 relative to the vehicle 10 can be determined and therefore the acoustic source 41 may be localized such that a location of the acoustic source 41 relative to the vehicle 10 can be determined, for example using three-dimensional coordinates. However, it might be preferred that the localization is determined based on two receiving directions. Energy differences may additionally be used to eliminate hypothetical directions. The described process may be referred to as a low latency, short-range maneuver dependent localization of acoustic sources 41.

In an exemplary embodiment, the localization of the acoustic sources 41 can be carried out based on an inter-array energy level difference elimination by the localization module 44b of processor 44. This inter-array energy level difference elimination may include a localization based on an acoustic intensity or energy determination of the considered acoustic sources 41, i.e. finding the acoustic source 41 from which the strongest acoustic signal 41a is received by the different audio sensor arrays 40a-40d.

In an exemplary embodiment, the processor 44 estimates whether the acoustic source 41 lies within the driving path (not shown) of the vehicle 10 based on the pre-programmed driving maneuver or an updated driving maneuver and the determined receiving direction of the acoustic source 41. The acoustic source 41 lies within the driving path if the acoustic source 41 is localized such that a collision event between the vehicle 10 and the acoustic source 41 would occur if the acoustic source 41 does not move away and the vehicle 10 continues following the pre-programmed driving maneuver without control intervention. In such an event, i.e. when it was estimated that the acoustic source 41 is within or intersects the driving path of the vehicle 10 and therefore the processor 44 estimates that the acoustic source 41 lies within the driving path of the vehicle 10, the processor 44 further determines a range between the vehicle 10 and the acoustic source 41 in order to confirm that the acoustic source 41 certainly lies within the driving path of the vehicle 10. It is preferred that the processor 44 determines the range between the vehicle 10 and the acoustic source 41 only if it is determined that the acoustic source 41 lies within the driving path of the vehicle 10. The range determination may thus be used to provide a confirmation whether the acoustic source 41 really lies within the driving path of the vehicle 10, wherein the receiving directions determined beforehand may only indicate which acoustic sources 41 are certainly not within the driving path of the vehicle 10. Therefore, it is possible to consider only those acoustic sources 41 in the range determination which are not excluded to lie within the driving path after the localization using the receiving directions.

In an exemplary embodiment, it is possible that the localization which is based on the determined receiving directions provides an information about whether the acoustic source 41 can be excluded to lie within the driving path of the vehicle 10 or whether the acoustic source 41 cannot be excluded to lie within the driving path of the vehicle 10. This means, a first estimation is carried out whether there is a chance that the acoustic source 41 lies within the driving path. If so, the range between the vehicle 10 and the acoustic source 41 is determined to certainly determine that the acoustic source 41 lies within the driving path or not. If the receiving directions for the acoustic source 41 do not indicate that the acoustic source 41 lies within the driving path, then there is no range determination carried out by the processor 44, i.e. some receiving directions can indicate that the acoustic source 41 is for sure not in the maneuver path and these are not further considered. Therefore, it may be possible that it can only be certainly determined if the source is in the driving path after the range has been determined.

In an exemplary embodiment, the processor 44 determines the range between the vehicle 10 and the at least one acoustic source 41 based on triangulation using at least two of the audio sensor arrays 40a-40d. In this manner, the range, e.g. the distance between the vehicle 10 and the acoustic source 41 can be determined at a certain point in time.

In an exemplary embodiment, the processor 44 can also obtain audio data of a plurality of different acoustic sources 41 in the environment of the vehicle 10 and determine a receiving direction for each of the plurality of acoustic sources 41 based on the audio data. In particular, the processor 44 determines the location of each acoustic source 41. The receiving directions are thus indicative of respective directions of the plurality of acoustic sources 41 relative to the vehicle 10 which provides the locations of each of the acoustic sources 41. The processor 44 then determines for each of the acoustic sources 41 whether it lies within the driving path of the vehicle 10 based on the pre-programmed driving maneuver and the determined receiving directions, i.e. locations, of each of the plurality of acoustic sources 41. The processor 44 selects those acoustic sources 41 that are determined to lie within the driving path of the vehicle 10 such that the processor 44 can then determine a range between the vehicle 10 and each of the selected acoustic sources 41. In particular, a range or distance between each acoustic source 41 that lies on the upcoming driving path (selected acoustic sources 41) and the vehicle 10 is determined. The other acoustic sources 41 that are not selected and thus do not lie within the driving path of the vehicle 10 are discarded. In other words, the processor 44 therefore selects all acoustic peaks in the maneuver direction, i.e. all acoustic sources 41 that lie within the driving path of the vehicle 10, and discards all other peaks, i.e. all acoustic sources 41 that do not lie within the driving path of the vehicle 10.

In an exemplary embodiment, the processor 44 determines a minimum range out of the determined ranges between the selected acoustic sources 41 and the vehicle 10. In other words, only the selected acoustic sources 41 which were determined to lie within the driving path of the vehicle 10 and for which a range has therefore been determined are compared according to their ranges such that a single acoustic source 41 from the plurality of acoustic sources 41, which is most proximal to the vehicle 10, is selected.

In an exemplary embodiment, the processor 44, for example the array selection module 44c of the processor 44, selects a single one of the audio sensor arrays 40a-40d, for example array 40c. The selection takes place by determining which of the audio sensor arrays 40a-40d receives a maximum signal-to-noise-ratio from the selected single acoustic source 41 which has been selected as being most proximal to the vehicle 10. In other words, the audio sensor array 40c which receives the highest acoustic signal and the lowest acoustic noise may be selected. The result is that a selected single audio sensor array 40c is further used by the processor 44 to beamform towards the selected acoustic source 41 which is most proximal to the vehicle 10, i.e. to select an audio channel for an audio signal from an audio sensor, e.g. from a single audio sensor, of the selected audio sensor array 40c. This may be carried out by the spatial object separation module 44d of the processor 44.

In an exemplary embodiment, a non-transitory computer readable medium 46 stores pre-trained audio models besides the pre-programmed driving maneuver. The audio models may be descriptive for different acoustic scenarios or the characteristics of different types or arrangements of acoustic sources. The processor 44, in particular the pattern recognition module 44e, is then able to allocate the selected audio signal to at least one of the pre-trained audio models stored on the non-transitory computer readable medium 46. This can be understood as a comparison between the selected audio signal and a pre-trained audio model which is carried out to obtain a certain probability based on which it can be assumed that the selected audio signal belongs to a specific pre-trained audio model. In other words, the selected audio signal is classified. This procedure can be carried out by the type and urgency classifier module 44f of the pattern recognition module 44e. Therefore, a predetermined probability threshold can be applied indicating which probability has to be achieved to indicate that the driving scenario, in particular the acoustic source 41, has been correctly identified. The processor 44 can then determine a type of the at least one acoustic source 41 based on the comparison and the probability calculation. The processor 44 can then also determine an urgency estimation of a current driving scenario by analyzing the driving situation involving the vehicle 10 and the surrounding acoustic sources 41, based on the comparison and the probability calculation. A positive urgency estimation may indicate an upcoming collision event between the acoustic source 41 and the vehicle 10. The urgency estimation may thus be dependent on how urgent an intervention of the vehicle control system is required to avoid a collision event. This can be determined based on a comparison of the selected audio data and the audio models which provides an indication of a probability for a certain current driving scenario, in particular of a current situation describing the positioning and movement of the vehicle 10 and the acoustic source 41. Based on this probability approach, it can be determined how urgent a change of the situation is to be initiated to avoid an upcoming dangerous situation or even a collision between the acoustic source 41 and the vehicle 10. Both the non-transitory computer readable medium 46 and the type and urgency classifier module 44f are parts of the pattern recognition module 44e of processor 44. The urgency estimation may involve an urgency related processing of the audio data based on a pitch variation under doppler impact.

In an exemplary embodiment, the above described process is iteratively repeated by the processor 44 until a clear, i.e. determinable type and/or urgency estimation is possible. A determinable urgency estimation is present if a positive urgency estimation or a negative urgency estimation can be made. A positive urgency estimation may indicate a likely upcoming collision event between the acoustic source 41 and the vehicle 10 and that further verification of this urgency estimation may be required to provide a control intervention for the vehicle 10. A negative urgency estimation may indicate that a collision event can be excluded. The processor 44 will obtain second audio data of the at least one acoustic source 41 if the result of the urgency estimation is indeterminable or unclear, for example when a classification of the same selected audio signal or another selected audio signal is necessary to carry out the urgency decision, i.e. to make a positive or negative urgency estimation. The decision whether an urgency estimation is positive, negative or indeterminable can be carried out by the urgency decision module 44g. If the result of the urgency estimation is indeterminable, another acoustic sensing of the environment can be carried out to receive further audio signals and to obtain a corresponding second audio signal of another driving scenario based on the obtained second audio data of the at least one acoustic source 41 and the set of audio models.

In an exemplary embodiment, the processor 44 obtains further sensor data of the at least one acoustic source 41 in the environment of the vehicle 10. These further sensor data can be optical data from a camera 47a or Lidar sensor 47b or data from a radar sensor 47c. The processor 44 has a sensor data fusion module 44h which provides fused data based on a fusion of the further sensor data of the at least one acoustic source 41 with the selected audio data of the at least one acoustic source 41, in particular the selected audio signal from the selected audio channel. The data fusion may provide a verification of the correctness of the urgency estimation which is based on the audio data obtained from the audio sensors, i.e. the audio sensor array arrangement 40. The processor 44 thus verifies the urgency estimation of the current driving scenario based on the fused data. If the urgency estimation is confirmed by the further sensor data and the data fusion, then the processor 44 controls the vehicle 10 based on the verified urgency estimation of the current driving scenario.

In an exemplary embodiment, the vehicle 10 is controlled or maneuvered by the processor 44, in particular by the AV controller of the maneuver system module 30. The controlling and maneuvering may include a changing of the driving path of the vehicle 10 or a stopping the vehicle 10. Changing the driving path may include driving a left turn or a right turn, etc.

In an exemplary embodiment, the system 1 provides an improved redundancy for sensor-based environment detection and can compensate unexpected events occurring due to failure of sensors or decision logic, obstructions, blind spots, and human behavior in general. The system 1 is adapted for to handle unexpected events indicated by a shout or cry of a person, e.g. a pedestrian, upon maneuvering or parking the vehicle 10. However, further applications are possible, such as handling unexpected events indicated by a horn or a screech in the environment. The system 1 improves the safety in maneuvering AV's, in particular the safety of the drivers and passengers of the AV's, but also the persons in the environment of the vehicle 10.

In an exemplary embodiment, the system 1 provides for a low latency classification including a successive evaluation of putative events based on a sensor array detection of a direction of acoustic sources 41 relative to the vehicle 10, a maneuver of the vehicle, a range between the acoustic sources 41 and the vehicle 10 and an urgency estimation being indicative of a requirement to change a driving condition of the vehicle 10. The duration of the evaluation can be incremented and iteratively carried out until a predetermined detection confidence is reached. This will be described in further detail with reference to FIGS. 3A and 3B.

In an exemplary embodiment, the system 1 also provides a maneuver dependent spatial scan. Therein, events may be incrementally evaluated only in the maneuver direction, i.e. only for the acoustic sources 41 which are located in the driving path of the vehicle 10. Afterwards, a range estimation only for acoustic sources located in the maneuver direction (DoA's in maneuver direction) is carried out. Furthermore, the beamforming is applied only if the acoustic sources 41 and the range are determined to be in maneuver direction.

In an exemplary embodiment, the system 1 also provides an architecture for detecting a short range event. A distributed microphone architecture is provided as, for example, described with the reference to FIGS. 6 to 10. Some events can be filtered by energy differences between the audio sensor arrays 40a-40d of the audio sensor arrangement 40, wherein the energy differences are based on the different intensities of different acoustic signals 41a received from the acoustic sources 41. By applying this, it is possible exploit the car as a blocking element for the elimination of certain acoustic sources 41 which are therefore not considered for the urgency estimation.

Figure 3A:
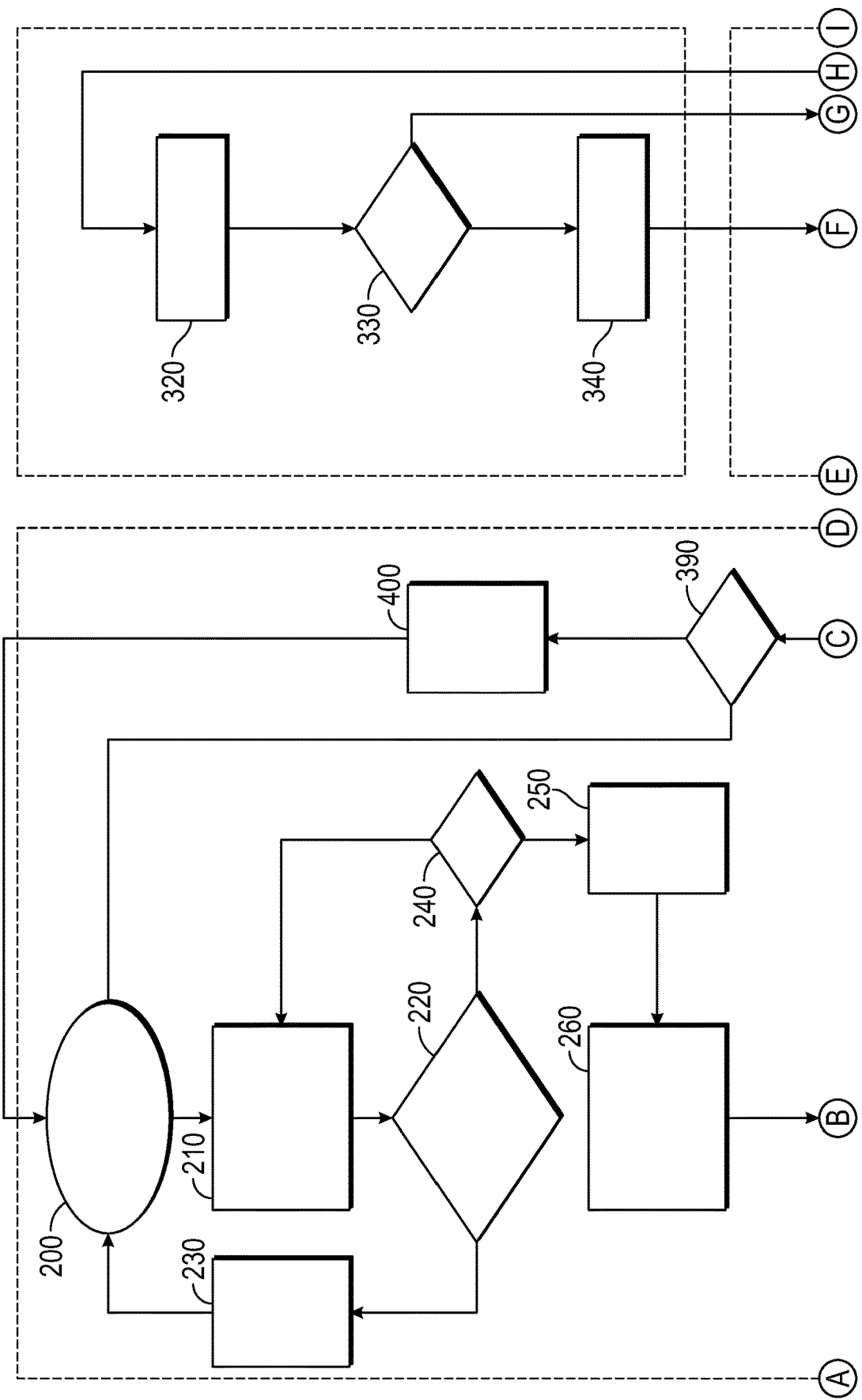
FIGS. 3A and 3B show a block diagram of a method for adapting a driving condition of a vehicle upon detecting an event in an environment of the vehicle in accordance with an embodiment.
Figure 3B:
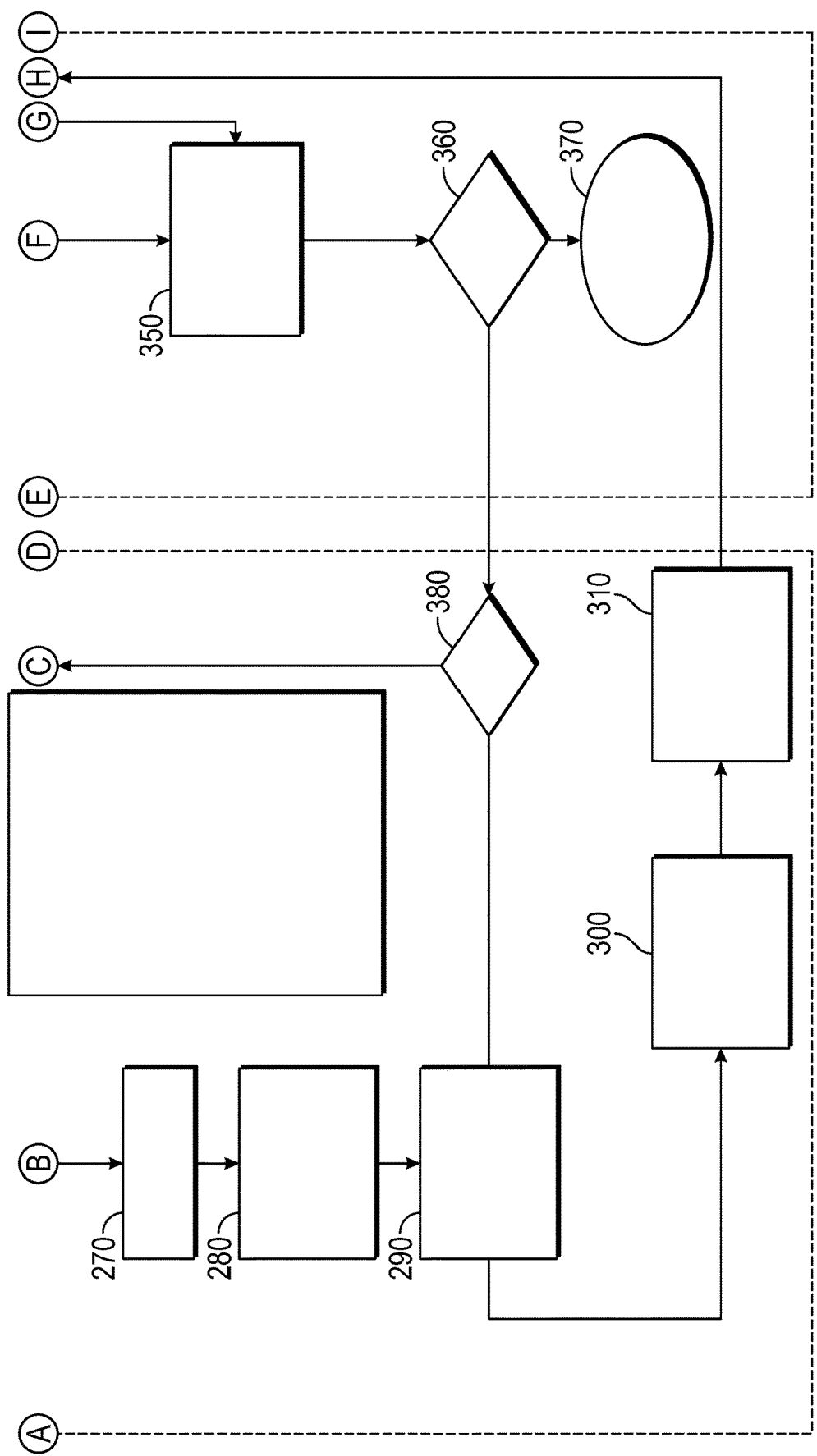

FIGS. 3A and 3B show a block diagram of a flow chart of an exemplary method for adapting a driving condition of a vehicle 10 upon detecting an event in an environment of the vehicle 10. The method is carried out by processor 44 of the system 1 of FIGS. 1 and 2. In the following M represents the number microphones in one audio sensor array, N represents the number of audio sensor arrays, n represents the audio sensor array index, P represents the number of receiving directions of acoustic sources (i.e. peaks) in maneuver direction, D represents the number of receiving directions of acoustic sources (i.e. peaks) in maneuver direction after an inter-array energy level difference elimination, d represents the peak index and SU represents a Boolean for a "sound urgent flag".

In an exemplary embodiment, at step 200, n is set to "0" and SU is set to "0". At step 200, the method starts collecting samples of acoustic signals from the environment of the vehicle. N audio sensor arrays are used to obtain these samples of acoustic signals from the environment. Therein, the number of audio channels provided to receive the acoustic signals from the environment are determined multiplying N by M. At the beginning of the iterative process at step 210 shown in FIG. 2, parameter n is incremented. The receiving directions of the acoustic signals is determined separately for each $n^{th}$ audio sensor array at step 210. In other words, step 210 applies a DoA (Direction of Arrival)—estimation for the $n^{th}$ audio sensor array. After the receiving directions have been obtained in step 210 by the $n^{th}$ audio sensor array, a determination is made at step 220, whether the acoustic signals, i.e. the peaks, in the environment are in the maneuver direction of the vehicle. If not, the audio buffer is cleared at step 230 and the process begins again with step 200, wherein n is now set to "1". If yes, the process continues with step 240, where it is determined if n is equal to N. If not, i.e. if the DoA estimation has not been made for each $n^{th}$ audio sensor array, then n is again incremented, and the receiving directions of the acoustic signals (peaks) are determined for the next audio sensor array again in step 210. If yes, d is set to "0" in step 250. At step 260, an inter-array energy difference between the different audio sensor arrays is determined which may include determining an acoustic intensity or energy level for the different N audio sensor arrays. At step 260, all acoustic sources which are estimated not to lie within the maneuver direction and therefore are not within the driving path of the vehicle, can be eliminated, e.g. discarded, and all other acoustic sources that are estimated to lie within the driving path of the vehicle are selected for further consideration in step 270. At step 270, a range is estimated or determined for all the acoustic sources that are possibly located in the maneuver direction of the vehicle. i.e. that are not confirmed to lie outside of the driving path of the vehicle. At step 280, after determining the ranges or distances between the vehicle and each of the acoustic sources that lie within the driving path, the ranges for the acoustic sources are sorted according to the proximity to the vehicle. At step 290, the acoustic source that is most proximal to the maneuver of the vehicle is selected and parameter d is incremented, i.e. set to "1". This is, at step 290, a single acoustic source is selected. After step 290, it is still all the audio channels (N multiplied by M) from which the audio data is obtained. However, at step 300, the audio sensor array having the highest signal-to-noise ratio is selected, so that only one audio sensor array with M audio sensors (microphones) is active for the further process. The other audio sensor arrays not selected due to a lower signal-to-noise ratio relative to the selected one are not used in the further process. The selected audio sensor array then, at step 310 selects an audio channel for an audio signal from one of the audio sensors (microphones). This procedure is also referred to as beamforming towards the direction of the selected acoustic source most proximal to the vehicle. The result is that only one acoustic source is considered in the following urgency estimation at step 320 so that a classification is applied on a clean signal. In particular, the acoustic source is classified at step 320 using the acoustic audio data via the selected audio channel and a set of audio models pre-stored on a non-transitory computer readable medium. A comparison between these data is made and a probability approach for determining the presence of a certain acoustic source and/or a certain driving scenario is carried out. Based on this probability approach, an urgency decision is made in step 330. If the urgency decision is positive, parameter SU is set to "1" in step 340 which results in an indication of an urgent scenario (sound urgent flag), and a verification of this indication of an urgent scenario is carried out based on a data fusion with further sensor data from other sensors at step 350. If the urgency decision is negative, no indication of an urgent scenario (sound urgent flag) is made and SU remains set at "0". However, the verification of such an indication is also verified by data fusion in step 350. The further sensor data are obtained from the selected acoustic source most proximate to the vehicle via sensors of a different sensor type, such as optical sensors. The verification in step 350 is based on a fusion of the further sensor data of the selected acoustic source with the audio data of the selected acoustic source received via the selected (beamformed) audio channel. The verification may verify the location of the acoustic source relative to the vehicle and/or the type of the acoustic source. Afterwards, at step 360 another probability approach for the presence of a certain acoustic source and/or a certain driving scenario is carried out based on the result of the verification by data fusion. If it was confirmed by the data fusion that an urgent scenario is given, then a control intervention by the system, in particular the AV controller will be carried out at step 370. If the verification at step 350 is not conformed in step 360, then it is determined in step 380 whether parameter d is equal to parameter D, i.e. whether the urgency of all acoustic sources that lie with in the driving path has been checked. In particular, if d is not equal to D at step 380, then the next proximate acoustic source will be considered starting again with step 290. If all acoustic sources that lie within the driving path have been checked, and therefore d is equal to D, then it is checked at step 390 whether SU has been set to "1", for example due to a positive urgency estimation. In this case, the audio buffer is cleared at step 400 and SU is again set to "0". If no positive urgency estimation has been made in step 330 and SU is still set to "0" at step 380, then it is directly continued again with step 200 where the method will again start from the beginning.

In an exemplary embodiment, the vehicle 10 and/or system 1 of FIGS. 1 and 2 may be configured to execute the above-described method of FIGS. 3A and 3B.

In an exemplary embodiment, steps 200 to 310 as well as steps 380 to 400 of FIGS. 3A and 3B may be summarized as a maneuver dependent spatial audio scan. Steps 320, 330 and 340 together may be summarized as a low latency clear case audio classification. Steps 350, 360 and 370 may be summarized as a robust urgency detection. The described method is based on a microphone system and algorithm for enabling the detection of events, for example with low latency, short range, and urgency.

Figure 4:
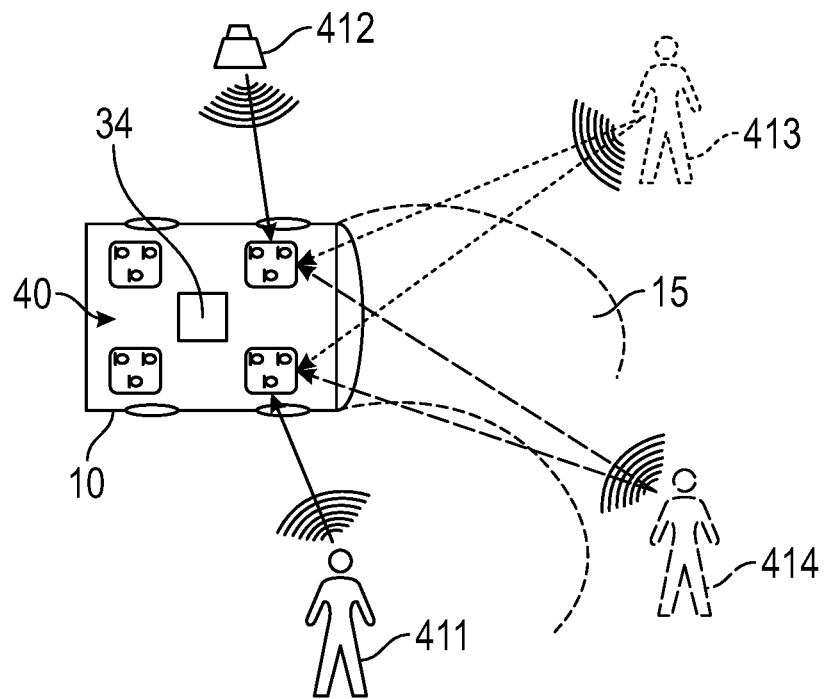
FIG. 4 is a driving scenario of the vehicle of FIG. 1 in accordance with an embodiment.

FIG. 4 is an exemplary driving scenario of the vehicle 10 of FIG. 1, wherein the vehicle 10 includes the system 1 (not shown) as described with reference to FIG. 2. This driving scenario may be representative for a so-called maneuver dependent spatial scan in a lowest latency mode. Four acoustic sources 411, 412, 413 and 414 are located in the environment of the vehicle 10. In the example of FIG. 4, the audio sensor arrangement 40 of the vehicle 10 includes four audio sensor arrays. It will be appreciated, however, that the arrangement 40 can have a different number of audio sensor arrays. At first, the receiving directions (DoA's) of each of the acoustic sources 411, 412, 413 and 414 relative to the vehicle 10 are determined using all audio sensor arrays of the audio sensor arrangement 40. Therefore, for each of the acoustic sources 411, 412, 413 and 414 receiving directions may be determined using two or more of the audio sensor arrays. In this manner, the location of each acoustic source 411, 412, 413 and 414 may be determined based on the respective two or more receiving directions of the respective audio sensor arrays. Then, in a next step, it is determined whether and which of the acoustic sources 411, 412, 413 and 414 lies within the driving path 15 of the vehicle based on a pre-programmed driving maneuver stored in a memory of the vehicle processor (not shown) and the determined receiving directions of the acoustic sources 411, 412, 413 and 414. For the acoustic sources 411 and 412, it is estimated that they do not lie within the driving path 15 of the vehicle 10. For the acoustic sources 413 and 414, it is estimated that they may lie within the driving path 15 of the vehicle 10 so that both acoustic sources 413 and 414 are selected and further considered. At this point, it is possible that it cannot yet be certainly determined which of the acoustic sources 413 and 414 really lies within the driving path 15. To certainly determine which of these acoustic sources 413 and 414 lies within the driving path 15, a range determination may be necessary. The range between the vehicle 10 and each of the selected acoustic sources 413 and 414 is determined by all audio sensor arrays of the audio sensor arrangement 40. In this way, it is determined that only acoustic source 414 lies within the driving path of the vehicle 10. The two arrays receiving a maximum signal-to-noise ratio are selected to carry out a range calculation between the vehicle 10 and each of the selected acoustic sources 413 and 414. Then, a beamforming, i.e. a selection of a single audio channel for the audio signal received from the acoustic source 414 is carried out. Afterwards, an urgency estimation, e.g. an urgency classification, is carried out by using the acoustic audio data via the selected audio channel and a set of audio models pre-stored in the memory. If the urgency estimation provides a positive result indicating that an urgent intervention is required, for example if it is detected that a collision between the acoustic source 414 and the vehicle will most likely occur if no intervention of the vehicles control system is provided, then the AV controller 34 of the vehicle 10 will control the vehicle 10 to avoid such a collision by stopping the vehicle 10 or by changing the maneuver direction.

Figure 5:
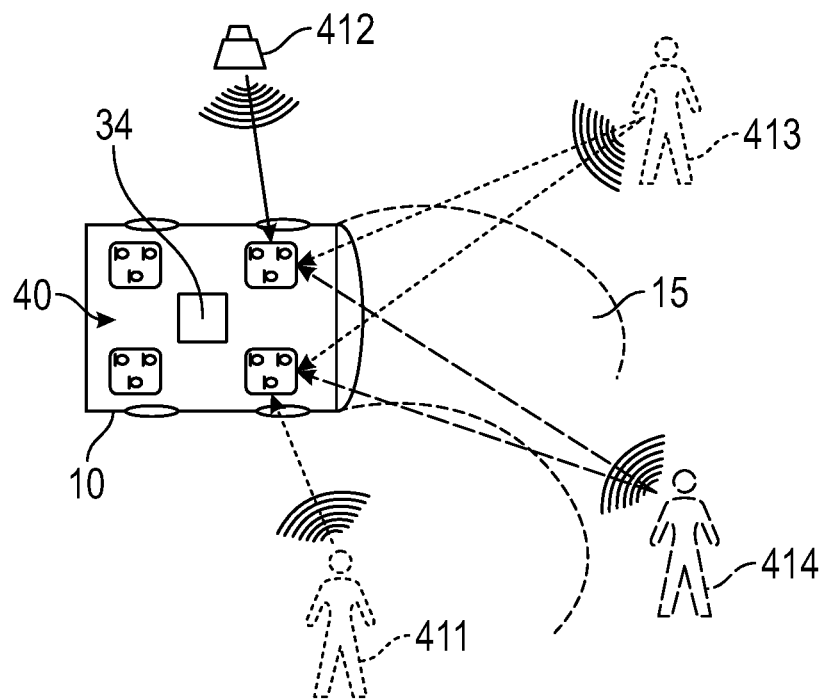
FIG. 5 is a driving scenario of the vehicle of FIG. 1 in accordance with another embodiment.

FIG. 5 is another exemplary driving scenario of the vehicle 10 of FIG. 1, wherein the vehicle 10 includes the system 1 (not shown) as described with reference to FIG. 2. This driving scenario may be representative for a so-called maneuver dependent alerting other sources mode. Four acoustic sources 411, 412, 413 and 414 are located in the environment of the vehicle 10. In the example of FIG. 5, the audio sensor arrangement 40 of the vehicle 10 includes four audio sensor arrays. It will be appreciated, however, that the arrangement 40 can have a different number of audio sensor arrays. At first, the receiving directions (DoA's) of each of the acoustic sources 411, 412, 413 and 414 relative to each audio sensor array of the vehicle 10 are determined using all audio sensor arrays of the audio sensor arrangement 40. Acoustic sources 411 and 412 are estimated not to lie within the driving path 15 of the vehicle 10, however, a beamforming, i.e. a selection of a single audio channel for each of the audio signals received by the acoustic source 411 and by the acoustic source 412 is nevertheless carried out. Afterwards, an urgency estimation, e.g. an urgency classification, is carried out by using the acoustic audio data via the selected audio channel for each acoustic source 411 and 412 and a set of audio models pre-stored in the memory. For acoustic source 411, an urgent scenario is determined and a low-alert message is sent to the AV controller 34. For acoustic source 412, the urgency estimation was negative and no alert message is sent to the AV controller 34. For both acoustic source 413 and acoustic source 414, it is estimated that these lie within the driving path of the vehicle 10 using all audio sensor arrays of the audio sensor arrangement. Afterwards, those arrays receiving a maximum signal-to-noise ratio are selected for each of the acoustic sources 413 and 414. Then, the range calculation between the vehicle 10 and each of the selected acoustic sources 413 and 414 is carried out. For acoustic source 413, it is then determined that it does not lie within the driving path 15 of the vehicle 10. In contrast, for acoustic source 414, it is determined that it lies within the driving path 15 of the vehicle 10, i.e. the acoustic source 414 is determined to be located in the vehicle maneuver. Then, a beamforming, i.e. a selection of a respective single audio channel for the audio signal received by the acoustic source 414 and for the audio signal received by the acoustic source 413 is carried out. Afterwards, for each of the acoustic sources 413 and 414, an urgency estimation, e.g. an urgency classification, is carried out by using the acoustic audio data via the respective selected audio channels and a respective set of audio models pre-stored in the memory. For the acoustic source 413, this urgency estimation is negative and a low-alert message is sent to the AV controller 34. For acoustic source 414, in contrast, the urgency estimation provides a positive result indicating that an urgent intervention is required. In this case, a critical message is sent to the AV controller 34 of the vehicle 10 which will control the vehicle 10 to avoid a collision with acoustic source 414 by stopping the vehicle 10 or by changing the maneuver direction.

Figure 6:
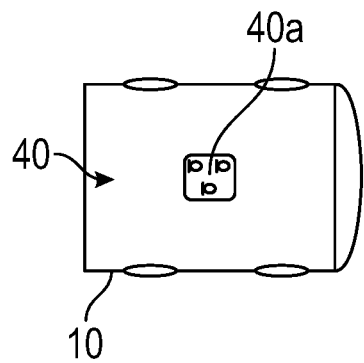
FIG. 6 is an audio sensor arrangement of a vehicle of FIG. 1 having a single audio sensor array in accordance with another embodiment.

FIG. 6 is an audio sensor arrangement 40 having a single audio sensor array 40*a*.

Figure 7:
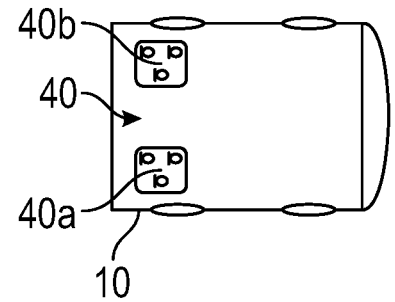
FIG. 7 is an audio sensor arrangement of the vehicle of FIG. 1 having two rear audio sensor arrays in accordance with an embodiment.

FIG. 7 is an audio sensor arrangement 40 of the vehicle 10 of FIG. 1 having two rear audio sensor arrays 40*a* and 40*b*. Such an arrangement provides a good direction and range determination in rearward directions.

Figure 8:
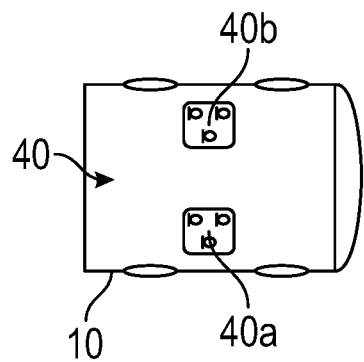
FIG. 8 is an audio sensor arrangement of the vehicle of FIG. 1 having two centrally arranged audio sensor arrays in accordance with an embodiment.

FIG. 8 is an audio sensor arrangement 40 of the vehicle 10 of FIG. 1 having two centrally arranged audio sensor arrays 40*a* and 40*b*. Such an arrangement provides a reasonable direction and range determination in forward and rearward directions.

Figure 9:
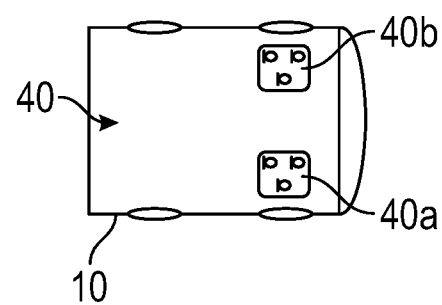
FIG. 9 is an audio sensor arrangement of the vehicle of FIG. 1 having two front audio sensor arrays in accordance with an embodiment.

FIG. 9 is an audio sensor arrangement 40 of the vehicle 10 of FIG. 1 having two front audio sensor arrays 40*a* and 40*b*. Such an arrangement provides a good direction and determination in forward directions.

Figure 10:
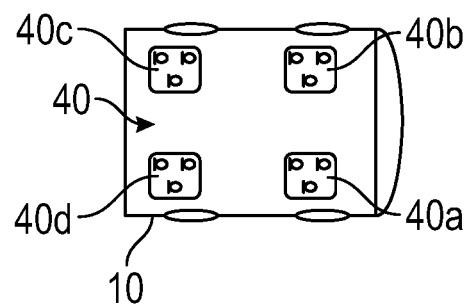
FIG. 10 is an audio sensor arrangement of the vehicle of FIG. 1 having four audio sensor arrays in accordance with an embodiment.

FIG. 10 is an audio sensor arrangement 40 of the vehicle 10 of FIG. 1 having four audio sensor arrays 40*a*-40*d*. Such an arrangement provides a good direction and determination in all directions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for adapting a driving condition of a vehicle upon detecting an event in an environment of the vehicle, comprising:
a non-transitory computer readable medium having stored thereon a pre-programmed driving maneuver of the vehicle, wherein the pre-programmed driving maneuver is indicative of a driving path of the vehicle, and further having stored a set of audio models, wherein each of the audio models being indicative of a respective acoustic scenario;
a processor configured to obtain audio data of at least one acoustic source in the environment of the vehicle,
to determine a receiving direction of the at least one acoustic source based on the audio data, the receiving direction being indicative of a direction of the at least one acoustic source relative to the vehicle;
to determine whether the at least one acoustic source lies within the driving path of the vehicle based on the pre-programmed driving maneuver and the determined receiving direction of the at least one acoustic source, and
to determine a range between the vehicle and the at least one acoustic source if it is determined that the at least one acoustic source lies within the driving path of the vehicle;
to control the vehicle based on the determined range; and
wherein the processor is further configured to determine an urgency estimation of a current driving scenario based on the obtained audio data of the at least one acoustic source and the set of audio models, and obtain second audio data of the at least one acoustic source if the result of the urgency estimation is not positive or negative, and to subsequently determine a second urgency estimation of another driving scenario based on the obtained second audio data of the at least one acoustic source and the set of audio models.

2. The system of claim 1,
wherein the processor is further configured to determine the range between the vehicle and the at least one acoustic source only if it is determined that the at least one acoustic source lies within the driving path of the vehicle.

3. The system of claim 1,
wherein the non-transitory computer readable medium further stores a set of audio models, each of the audio models being indicative of a respective acoustic scenario;
wherein the processor is further configured to determine a type of the at least one acoustic source based on the obtained audio data of the at least one acoustic source and the set of audio models.

4. The system of claim 1,
wherein the processor is further configured to obtain further sensor data of the at least one acoustic source in the environment of the vehicle, and
to provide fused data based on a fusion of the further sensor data of the at least one acoustic source with the audio data of the at least one acoustic source.

5. The system of claim 4,
wherein the further sensor data is obtained from at least one of a camera, a Lidar and a radar.

6. The system of claim 4,
wherein the processor is further configured to verify the urgency estimation of the current driving scenario based on the fused data.

7. The system of claim 6,
wherein the processor is further configured to control the vehicle based on the verified urgency estimation of the current driving scenario,
wherein controlling the vehicle by the processor includes one of changing the driving path of the vehicle and stopping the vehicle.

8. The system of claim 1, further comprising:
wherein the acoustic source is at least one of a person, an animal and a loudspeaker.

9. The system of claim 1, further comprising:
an audio sensor arrangement having a plurality of audio sensor arrays, wherein each of the plurality of audio sensor arrays in the audio sensor arrangement is located at a distinct location of the vehicle.

10. The system of claim 9,
wherein the audio sensor arrangement comprises at least two audio sensor arrays, each of the at least two audio sensor arrays having at least two audio sensors.

11. The system of claim 10,
wherein the processor is further configured to determine the range between the vehicle and the at least one acoustic source based on triangulation using the at least two audio sensor arrays.

12. A system for adapting a driving condition of a vehicle upon detecting an event in an environment of the vehicle, comprising:
a non-transitory computer readable medium having stored thereon a pre-programmed driving maneuver of the vehicle, wherein the pre-programmed driving maneuver is indicative of a driving path of the vehicle;
a processor configured to obtain audio data of at least one acoustic source in the environment of the vehicle,
to determine a receiving direction of the at least one acoustic source based on the audio data, the receiving direction being indicative of a direction of the at least one acoustic source relative to the vehicle;
to determine whether the at least one acoustic source lies within the driving path of the vehicle based on the pre-programmed driving maneuver and the determined receiving direction of the at least one acoustic source, and
to determine a range between the vehicle and the at least one acoustic source if it is determined that the at least one acoustic source lies within the driving path of the vehicle;
to control the vehicle based on the determined range,
wherein the processor is further configured to obtain audio data of a plurality of acoustic sources in the environment of the vehicle, determine a receiving direction for each of the plurality of acoustic sources based on the audio data, the receiving directions being indicative of respective directions of the plurality of acoustic sources relative to the vehicle, and
determine for each of the plurality of acoustic sources whether it lies within the driving path of the vehicle based on the pre-programmed driving maneuver and the determined receiving directions of each of the plurality of acoustic sources,
wherein the processor is further configured to
select the acoustic sources that are determined to lie within the driving path of the vehicle,
determine a range between the vehicle and each of the selected acoustic sources, and discard the acoustic sources that are determined not to lie within the driving path of the vehicle, determine a minimum range out of the determined ranges between the selected acoustic sources and the vehicle, and to select a single acoustic source from the plurality of acoustic sources, which is most proximal to the vehicle.

13. The system of claim 12, further comprising:

an audio sensor arrangement having a plurality of audio sensor arrays, wherein the processor is further configured to select one audio sensor array receiving a maximum signal-to-noise-ratio from the selected single acoustic source being most proximal to the vehicle, and to select an audio channel for an audio signal from an audio sensor of the selected audio sensor array.

14. The system of claim 13, wherein the processor is further configured to determine an urgency estimation of a current driving scenario based on the audio signal of the selected audio channel and a set of audio models stored on the non-transitory computer readable medium.

15. A method for adapting a driving condition of a vehicle upon detecting an event in an environment of the vehicle, comprising:

storing, on a non-transitory computer readable medium, a pre-programmed driving maneuver of the vehicle, wherein the pre-programmed driving maneuver is indicative of a driving path of the vehicle;

storing, on the non-transitory computer readable medium, a set of audio models, wherein each of the audio models being indicative of a respective acoustic scenario obtaining, by a processor, audio data of at least one acoustic source in the environment of the vehicle, determining, by the processor, a receiving direction of the at least one acoustic source based on the audio data, the receiving direction being indicative of a direction of the at least one acoustic source relative to the vehicle;

determining, by the processor, whether the at least one acoustic source lies within the driving path of the vehicle based on the pre-programmed driving maneuver and the determined receiving direction of the at least one acoustic source, and determining, by the processor, a range between the vehicle and the at least one acoustic source if it is determined that the at least one acoustic source lies within the driving path of the vehicle;

determining, by the processor, an urgency estimation of a current driving scenario based on the obtained audio data of the at least one acoustic source and the set of audio models, wherein when the urgency estimation is positive an upcoming collision event of the at least one acoustic source and the vehicle is indicated, and obtaining, by the processor, second audio data of the at least one acoustic source if the result of the urgency estimation is not positive or negative, determining, by the processor, a second urgency estimation of another driving scenario based on the obtained second audio data of the at least one acoustic source and the set of audio models;

controlling the vehicle, by the processor, based on the determined range, the urgency estimation, and the second urgency estimation.

* * * * *